(12) United States Patent
Dunnwald (10) Patent No.: US 8,528,724 B2
(45) Date of Patent: Sep. 10, 2013

(54) DEVICE FOR STRIPPING OFF MATERIAL FROM A CONVEYOR BELT OF A BELT CONVEYOR

(76) Inventor: Wilfried Dunnwald, Kamp-Lintfort (DE)

( * ) Notice: Subject to any disclaimer, the term of this patent is extended or adjusted under 35 U.S.C. 154(b) by 5 days.

(21) Appl. No.: 12/935,993

(22) PCT Filed: Apr. 2, 2009

(86) PCT No.: PCT/EP2009/053969
§ 371 (c)(1),
(2), (4) Date: Dec. 27, 2010

(87) PCT Pub. No.: WO2009/121938
PCT Pub. Date: Oct. 8, 2009

(65) Prior Publication Data
US 2011/0100782 A1      May 5, 2011

(30) Foreign Application Priority Data

Apr. 3, 2008   (DE) .......................... 10 2008 017 101

(51) Int. Cl.
*B65G 45/00*       (2006.01)
(52) U.S. Cl.
USPC ............................ 198/499; 198/497; 198/498
(58) Field of Classification Search
USPC .......................................... 198/497, 498, 499
See application file for complete search history.

(56) References Cited

U.S. PATENT DOCUMENTS

| | | | | |
|---|---|---|---|---|
| 2,878,926 | A | | 3/1959 | Harty et al. |
| 4,349,098 | A | * | 9/1982 | Veenhof ......................... 198/497 |
| 4,498,577 | A | * | 2/1985 | Veenhof ......................... 198/499 |
| 4,662,507 | A | * | 5/1987 | Veenhof ......................... 198/499 |
| 4,821,867 | A | * | 4/1989 | Veenhof ......................... 198/499 |
| 4,944,386 | A | * | 7/1990 | Swinderman ................. 198/499 |
| 5,248,026 | A | * | 9/1993 | Morefield ..................... 198/499 |
| 5,570,775 | A | * | 11/1996 | Kleinhans et al. ............ 198/635 |
| 7,584,835 | B2 | * | 9/2009 | Wimsatt et al. ............... 198/497 |
| 2004/0222065 | A1 | | 11/2004 | Meguro |

FOREIGN PATENT DOCUMENTS

| | | |
|---|---|---|
| DE | 801144 C | 12/1950 |
| DE | 19955421 A1 | 5/2001 |
| GB | 2061214 A | 5/1981 |

* cited by examiner

*Primary Examiner* — Douglas Hess
(74) *Attorney, Agent, or Firm* — The Webb Law Firm

(57) ABSTRACT

A device for stripping material from a conveyor belt of a belt conveyor in the area of a curve of a discharge drum below a discharge location of the belt conveyor, comprising a stripping body provided with a carrying element through which the stripping body is pulled or pullable against the conveyor belt, wherein the stripping body is further provided with a lift-off element which is disposed in the stripping body and offset from the carrying element and supports the stripping body when the latter is displaced in the belt running direction. The stripping body may include a plurality of stripping elements which define stripping edges and which have improved wear resistance compared to a material of the stripping body, wherein the stripping elements are configured and/or arranged, so that the stripping edges of adjacent stripping elements overlap partially overlap.

20 Claims, 10 Drawing Sheets

DEVICE FOR STRIPPING OFF MATERIAL FROM A CONVEYOR BELT OF A BELT CONVEYOR

BACKGROUND OF THE INVENTION

1. Field of the Invention

The invention relates to a device for stripping off material from a conveyor belt of a belt conveyor in a region of a curve of a discharge drum below a discharge location of the belt conveyor, having a stripping body which is of one-part or multi-part configuration.

2. Description of Related Art

Conventional stripping devices for belt conveyors, which devices are disposed in the region of the discharge drum, extend parallel to the drum axis. Furthermore, stripping devices for rotating drums or belt conveyors are known, in which a wire is used as a stripping body, wherein the wire is tensioned transversally across the surface of the drum or pulled in a helical manner over a portion of the circumference of the drum. Thus, the wire is provided with a tension spring at one end or at both ends, wherein the tension spring puts the wire under tension (DE 801 144).

A similar stripping device is known from the U.S. Pat. No. 2,878,926. Therein, one or two coil springs disposed in parallel with one another are used as stripping bodies, which are also tensioned in a helical manner over a portion of the circumference of the discharge drum of the belt conveyor.

The stripping devices known from DE 801 144 and U.S. Pat. No. 2,878,926 have not really succeeded in the market, probably because their cleaning effect in particular for a relatively sticky feed material is not satisfactory.

SUMMARY OF THE INVENTION

It is the object of the present invention to provide a device of the type as recited supra which is adapted to the belt surface in an optimum manner, requires relatively little space and which provides an improved cleaning effect while providing a gentle treatment of the conveyor belt.

This object is achieved through a stripping device with the features of claim 1.

The one-part or multi-part stripping body of the device according to the invention is provided with a carrying element, through which the stripping body is pulled against the conveyor belt or is configured to be pulled against the conveyor belt, and the stripping body is furthermore provided with a lift-off element, which is disposed in the stripping body offset from the carrying element and which supports the stripping body when it is moved in the running direction of the belt.

Thus, the lift-off element is preferably mounted at hard points of the belt conveyor, preferably without spring suspension or with a spring suspension that has a higher spring rate than the carrying element. For an excessive force impact caused by a substantially damaged belt or a foreign object lodged in the belt, wherein the force impacts the stripping body and the carrying element tangential to the conveyor belt looping around the drum, a reaction force is generated by the liftoff element in the stripping body, wherein the reaction force causes a torque oriented away from the drum, so that the stripping body or a segment of the stripping body that is loaded accordingly lifts off from the conveyor belt, and the stripping body thus slides troublefree over the damaged spot of the conveyor belt or the foreign object lodged therein.

Thus, the stripping device according to the invention cleans the conveyor belt in a gentler manner than the known stripping devices. In particular, the stripping device according to the invention facilitates an optimum adaptation of the stripping body to the belt surface to be cleaned due to the combination of a carrying element with an additional liftoff element, and thus provides an improved cleaning effect. The installation space requirements for the stripping device according to the invention are also small, and only insignificantly greater than the space requirement of the stripping device known from U.S. Pat. No. 2,878,926.

The carrying element and the liftoff element can be integrally connected to the stripping body according to another preferred embodiment of the invention, e.g. by encasing the respective metal chain in the stripping body made from plastic or elastomeric material.

Alternatively, tubular pass-through openings or receivers for the carrying element and the liftoff element can be fabricated into the stripping element, in particular integrally cast. According to a preferred embodiment of the invention, the receiver associated with the carrying element or liftoff element is configured as an open channel. This configuration is in particular advantageous when the stripping body is assembled from a plurality of body segments. Single worn body segments can thus be replaced quickly with new body segments.

An advantageous embodiment of the device according to the invention provides that the stripping body includes plural stripping elements which define stripping edges and which have improved wear resistance over the material of the stripping body, wherein the stripping elements are configured and/or disposed, so that the stripping edges of adjacent stripping elements partially overlap. Thus, the adaptation of the stripping body to the belt surface in the portion of the discharge drum of the belt conveyor and thus the cleaning performance of the device are further improved.

An embodiment is preferred in particular, in which the stripping body of the device according to the invention is rotated in a helical spiral, this means pulled against the conveyor belt like the helix of a thread, and in which the respective lower stripping element is partially covered by the stripping element disposed there above. This overlapping, step-shaped assembly of stripping elements assures that a foreign object possibly lodged in the conveyor belt or a damaged belt section protruding from the belt surface does not stick to a particular stripping element.

In order to assure an optimum adaptation of the stripping body to the belt surface, in particular when the stripping body shall contact the conveyor belt looping around the discharge drum, so that the contact occurs with the stripping body being rotated in a three-dimensional curve, it is provided according to another embodiment of the device according to the invention that the stripping body is made from a material that bends elastically, preferably from plastic material and/or elastomer.

In order to keep the wear of the stripping body as low as possible for a good cleaning effect, it is furthermore provided that the stripping body includes at least two edge portions facing the conveyor belt, wherein at least the upper edge portion or the first edge portion viewed in running direction of the conveyor belt is formed by at least one stripping element, which has improved wear resistance compared to the material of the stripping body. Preferably, this or these stripping elements, respectively, are made from hard metal and/or ceramics.

According to another advantageous embodiment of the invention, the at least one stripping element is provided with at least one spring element. This achieves, on the one hand, good compression of the stripping element at the conveyor belt, and, on the other hand, a deflection of the stripping element when contacting a foreign object lodged in the conveyor belt or protruding from the belt surface, or a protruding damaged spot of the belt. The spring element thus preferably includes at least one loop shaped section, where the carrying element, the liftoff element or a rod shaped connection element passes through.

DESCRIPTION OF THE PREFERRED EMBODIMENTS

Figure 1:
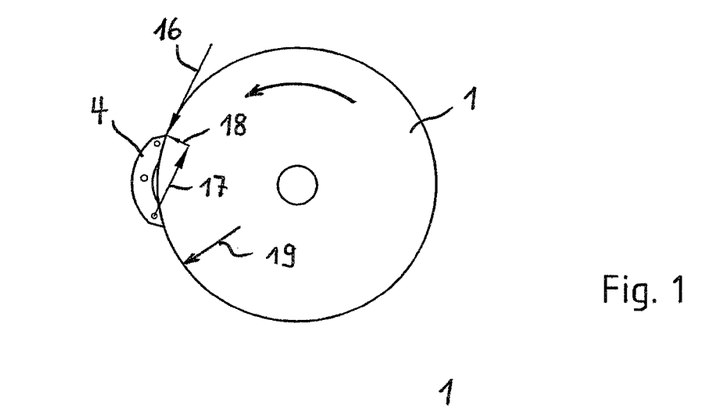
FIG. 1 illustrates a discharge drum of a belt conveyor with a stripping device according to the invention in a cross sectional view.
Figure 2:
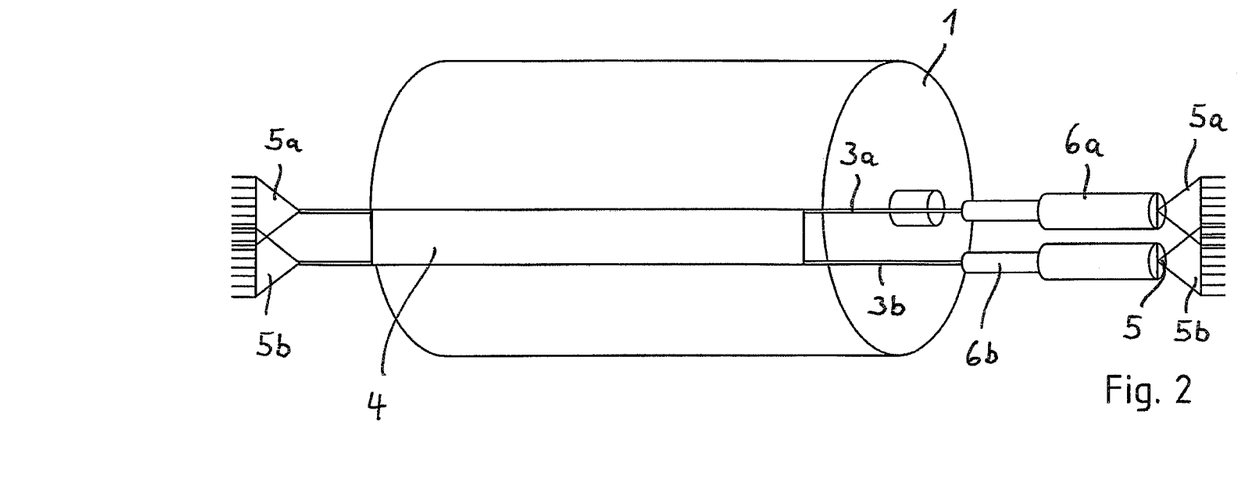
FIG. 2 illustrates a perspective longitudinal lateral view of the discharge drum with the stripping device of FIG. 1.

The FIGS. 1 and 2 illustrate a discharge or pulley drum 1 of a belt conveyor. The running direction of the conveyor belt or the rotating direction of the drum 1 is represented by an arrow.

At the curve of the discharge drum 1, enveloped by the belt, thus below the area where the feed material (not shown) is discharged from the conveyor belt, a stripping body of one-part or multi-part configuration is disposed. Material to be conveyed still adhering to the belt is separated from the belt through the stripping body 4.

The length of the stripping body 4 corresponds approximately to the axial length of the drum 1, at least however, to the width of the conveyor belt. The stripping body 4 is made from material that bends elastically, preferably plastic material and/or elastomeric material. The stripping body 4 is provided with a carrying element 3a, e.g. a metal chain, in particular a steel chain, through which it is pulled against the conveyor belt. The stripping body 4 is furthermore provided with a lift-off element 3b, which can also be configured as a metal or steel chain.

The metal chains 3a, 3b are cast in the elastically bending material of the stripping body 4 at a distance from one another. The metal chain used as a carrying element 3a is preferably disposed in the portion of the upper longitudinal edge of the stripping body 4, while the metal chain used as liftoff element 3b is disposed in the portion of the lower longitudinal edge of the stripping body 4. The two metal chains 3a, 3b extend substantially in parallel within the stripping body 4.

The carrying element 3a and the lift-off element 3b are attached to a support frame (outrigger) or to lateral cover plates (not shown) of the belt conveyor, wherein the lateral cover plates are mounted to the support frame in the area of the rotating bearings of the discharge drum 1. The attachment points 5a, 5b are disposed in the illustrated embodiment, so that the elongated stripping body 4 or the metal chains 3a, 3b extend substantially in parallel to the rotation axis of the discharge drum 1.

The metal chain used as carrying element 3a is attached in pull direction through a tension spring or gas pressure spring 6a at one of the hard points 5a. Thus, also the metal chain used as a lift-off element 3b can be attached in pull direction through a tension spring or gas pressure spring 6b at one of the hard points 5b (cf. FIG. 2). The spring characteristics of the tension spring or the gas pressure spring 6a, 6b is adjustable, and it is provided that the liftoff element 3b is attached with a higher spring constant (reset force) than the carrying element 3a at hard points 5b of the belt conveyor. The gas pressure spring attached at least at one end of the carrying element 3a or the tension spring 6a absorbs the vibrations occurring during operations at the stripping body 4.

Instead of chains, also steel cords can be used for the carrying element 3a and the liftoff element 3b of the device according to the invention. Clamping devices are being used at least at one of the two hard points 5a, 5b associated with the carrying elements 3a or the lift-off element 3b, e.g. tension hooks threaded onto a threaded bolt for tightening the carrying element 3a or the liftoff element 3b. The hard points 5a, 5b or the mounting elements disposed thereon include rated breakpoints.

During normal operation of the stripping device, the carrying element 3a supports the actual reset forces. When excessive forces impact the stripping body 4, e.g. due to larger damages to the belt or due to a foreign object lodged in the conveyor belt, the stripping body 4 is displaced in the running direction of the belt. This is facilitated through the force limiting spring 6a, through which the carrying element 3a is attached to the (lower) hard point 5a (cf. FIGS. 2 and 11). When the stripping body 4 is displaced in running direction of the belt, the lift-off element 3b starts bearing load because it is attached to the hard point 5b in a rigid manner or with a substantially higher spring constant. The attachment element 5 disposed at this location preferably includes at least one rated breakpoint.

Based on the shape of the stripping body 4, its arrangement relative to the discharge drum 1 and the arrangement according to the invention of the carrying element 3a and the lift-off element 3b, the tangential excessive force and the reactive force generated in the stripping body 4 create a torque, which has the effect that the stripping body 4, or a respectively loaded partial segment of the stripping body 4 lifts off from the conveyor belt 2, and the stripping body 4 slides over the damaged spot in the conveyor belt 2. This is illustrated in FIG. 1 based on force vectors, wherein the conveyor belt is not illustrated in FIG. 1 for reasons of simplicity. The vector 16 corresponds to the tangential excess force while the vector 17 designates the reactive force generated in the stripping body 4, and the vector 18 corresponds to a left turning momentum for a presumed drum or conveyor belt radius 19.

The stripping body 4 is configured so that the carrying element 3a and the lift-off element 3b, which are preferably respectively configured as a steel cable or a steel chain, are integrated in the stripping body 4 and do not require additional space. Thus, it is facilitated to configure the stripping body 4 very flat, e.g. strip shaped. The very flat contour of the stripping body 4 prevents a material accumulation at the stripping body, which would restrict the function of the stripping device.

Figure 10:
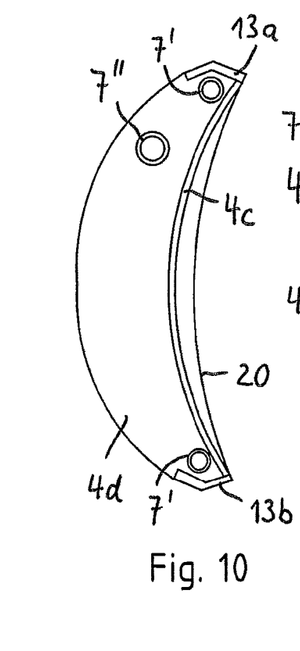
FIG. 10 illustrates a cross sectional view of the stripping body of FIG. 9.

The carrying element 3a and the lift-off element 3b disposed at an offset therefrom are connected with the stripping body 4 through positive bonding or form locking. In order to provide a form locked connection, receivers 7 are configured in the stripping body 4, or tubular pass-through openings 7' are embedded, through which the carrying element 3a or the lift-off element 3b, respectively, extend. The stripping body 4, which is configured in one-piece or multiple pieces, is made from plastic material or a rubbery material. The receivers 7 or the pass-through openings 7', respectively, are thus enveloped by the material of the stripping body 4, through injection molding or casting (cf. FIGS. 6 and 10).

Figures 3, 4:
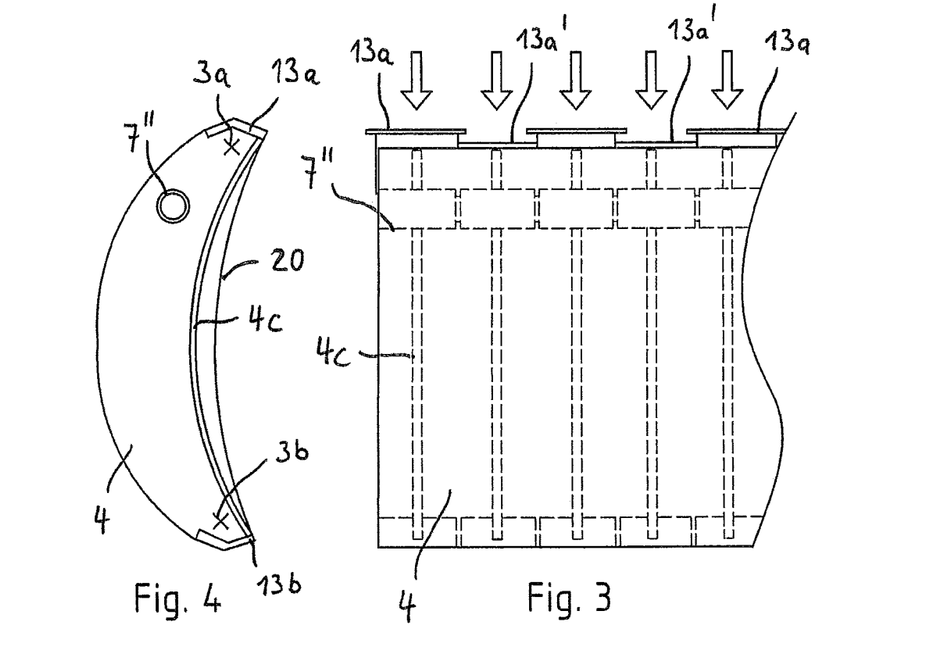
FIG. 3 illustrates a section of an one-piece stripping body of a device according to the invention in a longitudinal lateral view.
FIG. 4 illustrates a cross sectional view of the stripping body of FIG. 3.
Figure 8:
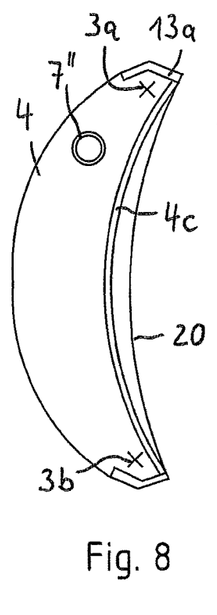
FIG. 8 illustrates a cross sectional view of the stripping body of FIG. 7.
Figure 9:
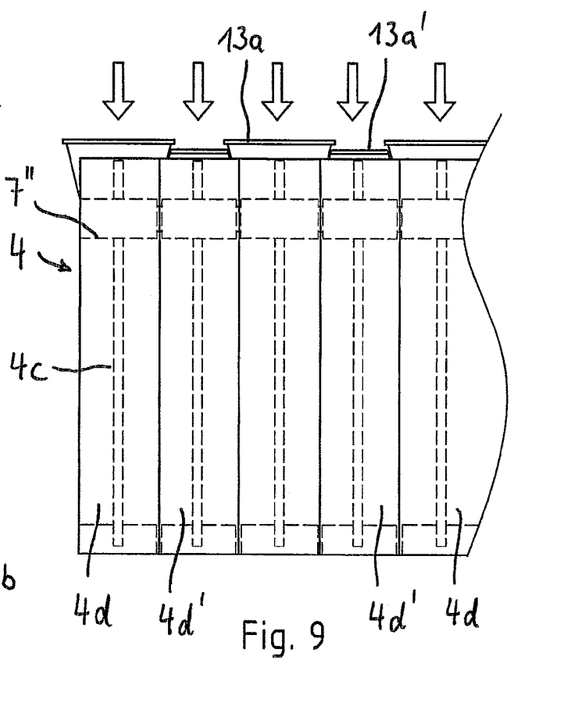
FIG. 9 illustrates of a section of another modular stripping body of a device according to the invention in longitudinal lateral view.

Alternatively, the carrying element 3a and the lift-off 3b can also be cast in the material of the stripping body 4, so that a positively bonded connection is provided (cf. FIGS. 4 and 8).

The stripping body 4 includes two edge portions oriented towards the conveyor belt 2, which are respectively formed by one or plural stripping elements 13a, 13b, which have increased wear resistance over the material of the stripping body 4. The stripping elements (wear elements) 13a, 13b are made from hard metal and/or ceramics.

Furthermore, it is illustrated in the drawing that the stripping body 4 includes a recess 20 at its side facing the conveyor belt, wherein the recess extends in a longitudinal direction of the stripping body 4. The recess 20 is vat shaped and has an arcuate or V-shaped cross sectional profile.

The wear resistant stripping elements 13a, 13b can be connected with the elastically bending material of the stripping body 4 in various manners. For example, the stripping elements 13a, 13b can have anchoring elements protruding from the backside, which are encased in a positively bonding manner by the material of the stripping body 4.

In the embodiment illustrated in FIGS. 3 and 4, the stripping body 4 is configured in one piece. It includes stripping elements 13a made from wear resistant material in its head portion oriented towards the running direction of the belt, wherein the stripping elements are alternately disposed at right angles to the longitudinal axis of the stripping body 4, so that they protrude or so that they are recessed. The belt running direction is indicated by arrows. The protruding stripping elements (wear elements) 13a thus overlap the stripping elements 13a' disposed there between so that they are recessed.

Furthermore, wear elements 13b are also provided at the lower longitudinal edge portion of the stripping body 4. The upper and lower wear elements 13a, 13b are connected with one another through plural spring elements 4c, e.g. welded, wherein the respective spring element 4c is encased in a positively bonding manner in the stripping body 4. The spring elements 4c are made e.g. from spring steel.

Furthermore, spacer sleeves 7" are included in the stripping body 4 at a small distance to the bend. The spacer sleeves 7" are used for receiving or supporting a cable-/or rod-shaped tension element (not illustrated).

Figures 5, 6:
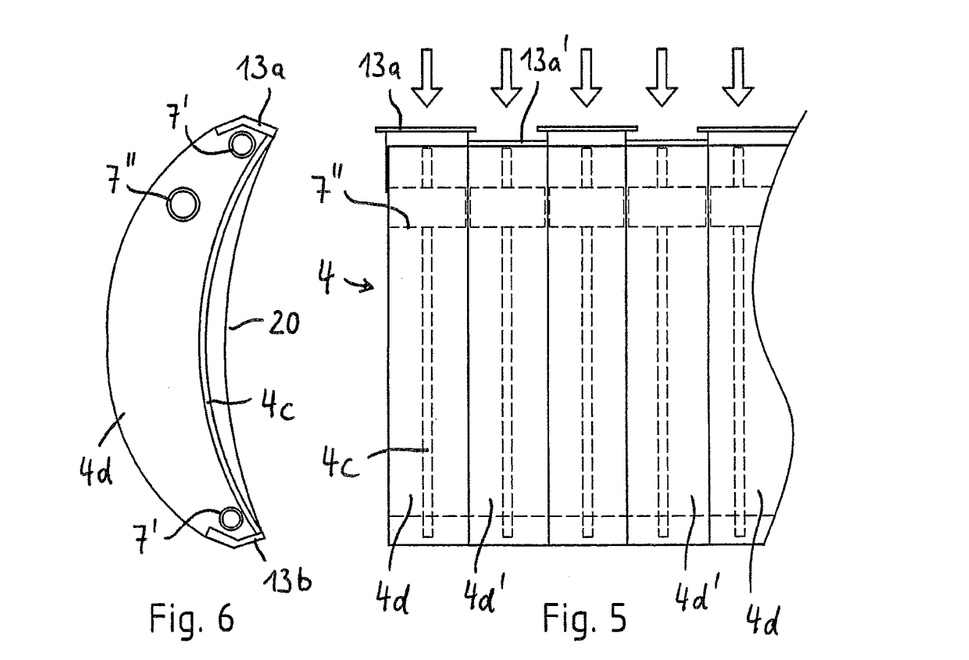
FIG. 5 illustrates a section of a modular stripping body of a device according to the invention in a longitudinal lateral view.
FIG. 6 illustrates a cross sectional view of the stripping body of FIG. 5.
Figure 7:
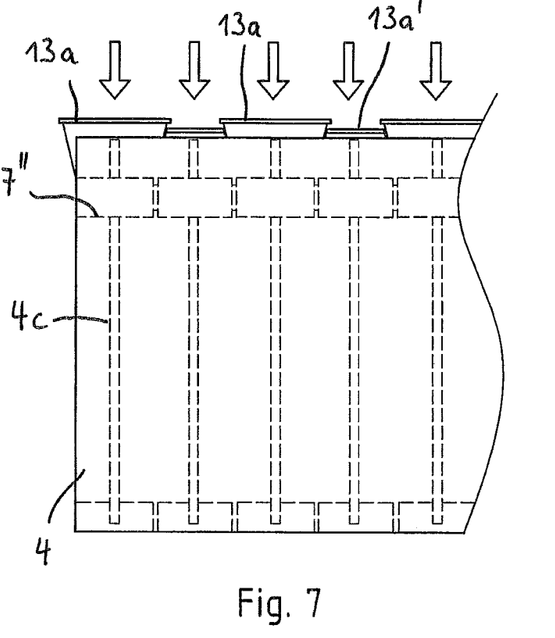
FIG. 7 illustrates a section of another one-piece stripping body of a device according to the invention in a longitudinal lateral view.

The embodiment illustrated in FIGS. 5 and 6 differs from the embodiment according to FIGS. 3 and 4, in that the stripping body 4 is configured modular, this means it is assembled from a plurality of relatively narrow partial bodies (component elements) 4d, 4d'. This configuration enables a simple length adaptation of the stripping body 4 to the width of the conveyor belt 2 to be cleaned by adding or removing respective partial bodies 4d, 4d'. The narrow component elements 4d, 4d' of the stripping body 4 include two different sizes, thus one size (4d') with a recessed stripping element (wear element) 13a', and a size (4d) with a stripping element (wear element) 13a protruding with respect thereto.

Wear elements 13b are in turn disposed at the lower longitudinal edges, wherein the upper wear element 13a or 13a' and the lower wear element 13b, of each partial body 4d, 4d', are connected by a wire 4c or the like made from spring steel. The spring or connection element 4c is encased in the respective partial body 4d, 4d'. Furthermore, spacer sleeves or hose or tubular sections 7, 7' are encased in the respective partial body 4d, 4d', wherein the spacer sleeves, hose or tubular sections are configured for receiving or supporting a cable- or rod-shaped tension element (not illustrated), or for passing steel chains or steel cables through, which are used as a carrying element 3a or lift-off element 3b, respectively.

FIGS. 7-10 illustrate two embodiments which substantially correspond to the embodiments described above. Differently from the embodiments according to FIGS. 3-6, the head portions of the stripping body 4 facing against the belt running direction are configured trapezoid. The protruding stripping elements (wear elements) 13a overlap in turn the stripping elements 13a', disposed there between in a recessed configuration.

Figure 11:
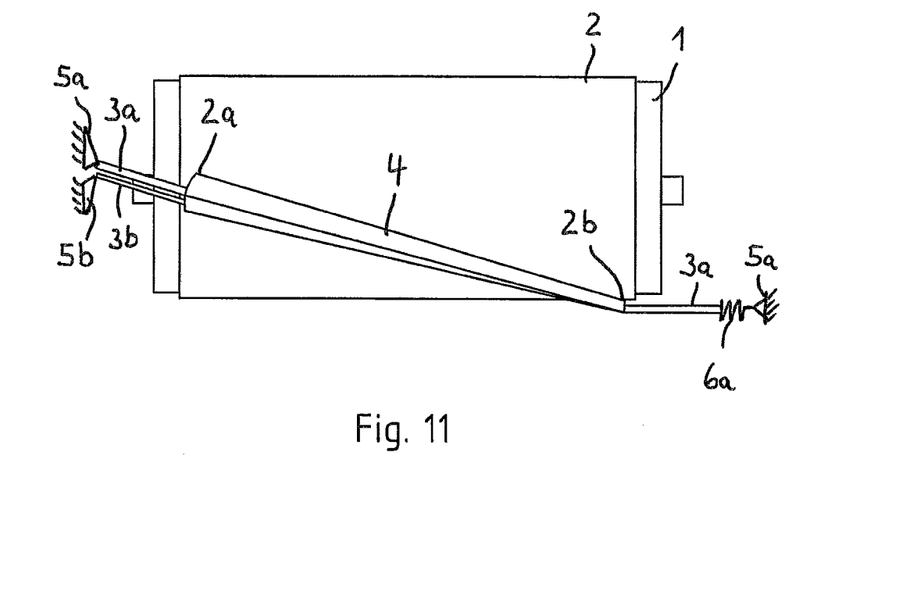
FIG. 11 illustrates a longitudinal lateral view of a discharge drum of a belt conveyor with a stripping device according to the invention, whose stripping body extends in a helical shape over a portion of the circumference of the discharge drum and is pulled against the conveyor belt.
Figure 12:
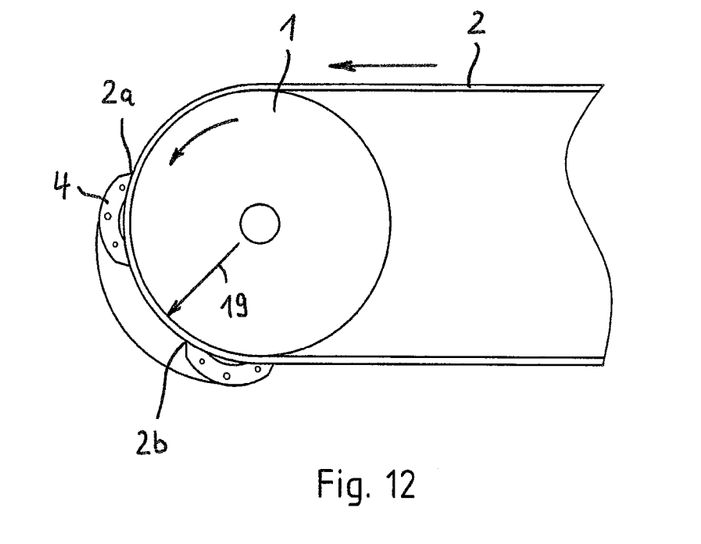
FIG. 12 illustrates the discharge drum with the stripping device of FIG. 11 in a cross sectional view.

The FIGS. 11 and 12 illustrate a preferred embodiment in which the stripping body 4 is fabricated twisted along its longitudinal axis by approximately 90°, or fabricated so that it is twistable, in particular bendable and/or fabricated partially pre-bent, so that it extends at the discharge drum 1, that is enveloped by the belt, along a three-dimensional curve. The carrying element 3a and the lift-off element 3b configured as steel cables or steel chains are integrated in the profile of the stripping body 4 and do not require additional space. The stripping body 4 is not pressed against the conveyor belt 2, like for other conventional belt strippers, but pulled to the belt 2 through the carrying element 3a and the lift-off element 3b. This is achieved in that the elongated stripping body 4 impacts the curvature of the discharge drum 1 enveloped by the conveyor belt 2 through a three-dimensional curve, wherein the stripping body 4 contacts the belt 2 at a slant angle and not at a right angle to the belt running direction. The stripping body 4 is configured and aligned so that the engaging point 2a of the belt 2 at the stripping body 4 is disposed proximal to the height of half the envelopment of the belt 2 at the discharge drum (cf. FIGS. 11 and 12). The run-off point 2b is disposed a few centimeters in front of the transition area from the curved belt path on the discharge drum to the straight belt path of the departing belt 2.

The stripping body 4 is configured so that it adapts to the curve of the belt 2 or to the radius 19 of the drum 1, and also to the torsion/rotation by approximately 90° over its length, so that it can clean the belt 2 over its entire length. For a tangential orientation of the carrying element 3 with reference to the curve of the conveyor belt 2 enveloping the discharge drum 1, almost no force induction occurs into the conveyor belt 2 at its edge portions, so that the belt is cleaned gently with relatively small contact pressure. For the embodiment illustrated in FIGS. 11 and 12, the force induction is essentially limited to the center portion of the belt 2, where the feed material typically adheres.

Figures 13, 14:
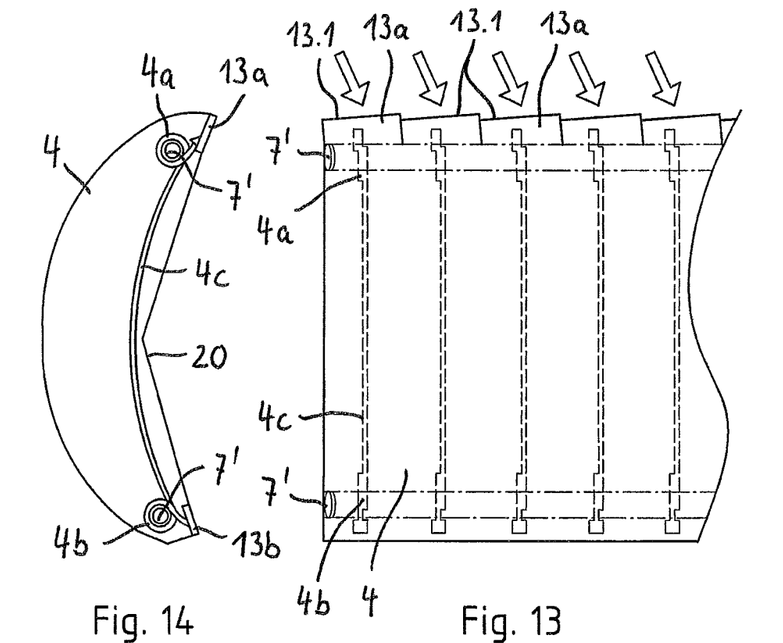
FIG. 13 illustrates a section of an one-piece configured stripping body, which is pulled against the conveyor belt in a helical shape.
FIG. 14 illustrates a cross sectional view of the stripping body of FIG. 13.
Figure 15:
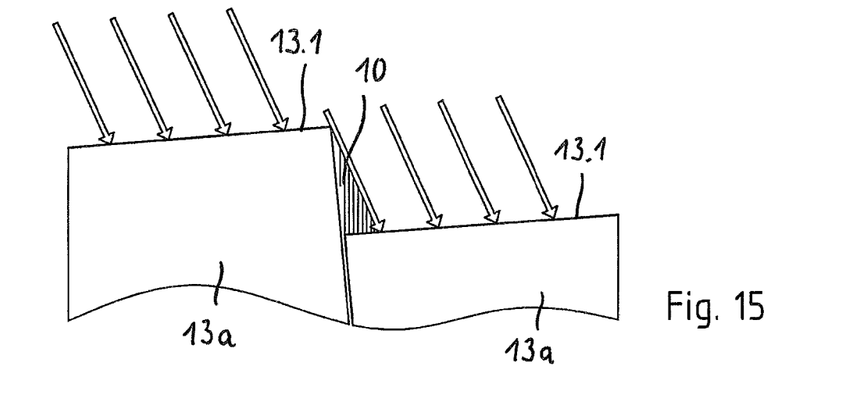
FIG. 15 illustrates an enlarged detail of FIG. 13.

The stripping body 4 contacting the curve of the belt-enveloped discharge drum 1 at a slant angle to the belt running direction is provided according to the embodiment illustrated in FIGS. 13 and 14 in turn with a plurality of stripping elements (wear elements) 13a, which define stripping edges 13.1, oriented at a slant angle to the belt running direction. The stripping elements 13a disposed at the upper longitudinal edge of the stripping body 4 are thus shaped and aligned so that the stripping edges 13.1 of adjacent stripping elements 13a overlap partially. This overlap assures optimum cleaning of the conveyor belt and can thus also be defined as a "cleaning overlap". The enlarged illustration in FIG. 15 of two adjacent wear elements 13a with their stripping edges facing the belt running direction at a slant angle emphasizes that the stripping edge 13.1 of the wear element 13a disposed lower is partially disposed in the "shade" 10 of the wear element disposed higher. This partial overlap furthermore assures that a belt damage or foreign object protruding from the surface of the belt cannot catch at a single wear element 13a.

Through the vat shaped recess 20 of the stripping body 4 at its side facing the belt 2 it is achieved that the stripping body 4 contacts the belt 2 only with the relatively small wear elements 13a, 13b, wherein the wear elements 13a, 13b define upper and lower longitudinal edges of the stripping body 4. Similar to the embodiments according to FIGS. 5, 6, 9 and 10, a spring steel element 4c is integrated into the respective partial bodies (component elements) 4d, wherein the spring steel element is fixated at the wear elements 13a, 13b.

Figure 29:
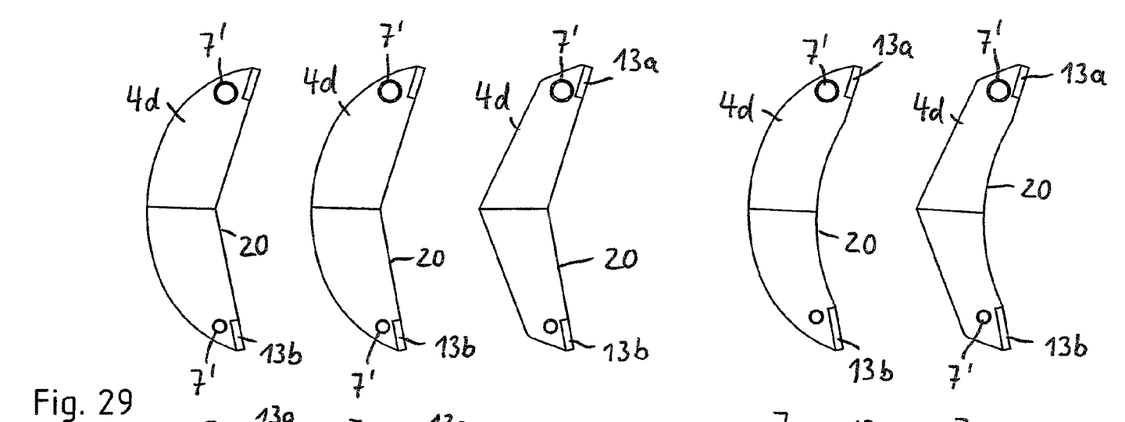
FIG. 29 illustrates five differently configured partial stripping bodies of a device according to the invention in a cross sectional view.

Additional different contours (cross sectional profiles) of the stripping body 4 or of partial bodies 4d, which form the stripping body 4 when put in series, are illustrated in FIG. 29.

Furthermore, a preferred embodiment is characterized in that the spring element 4c connecting the wear elements 13a, 13b includes at least one loop shaped section 4a, 4b, 4e. In the embodiment illustrated in FIGS. 13 and 14, the respective spring element 4c includes two loop shaped sections 4a, 4b which are penetrated by sleeves 7', which are used for receiving steel cables or steel chains as carrying elements 3a or lift-off elements 3b, respectively.

Figure 16:
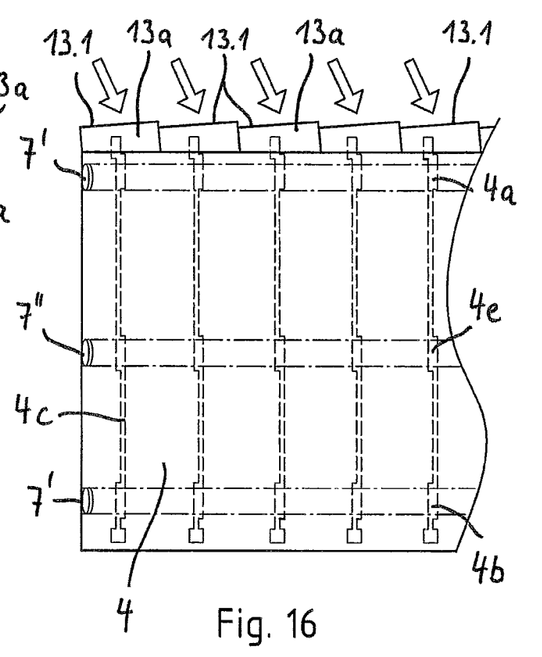
FIG. 16 illustrates a section of another one-piece stripping body which is pulled against the conveyor belt in a helical shape in a longitudinal lateral view.
Figure 17:
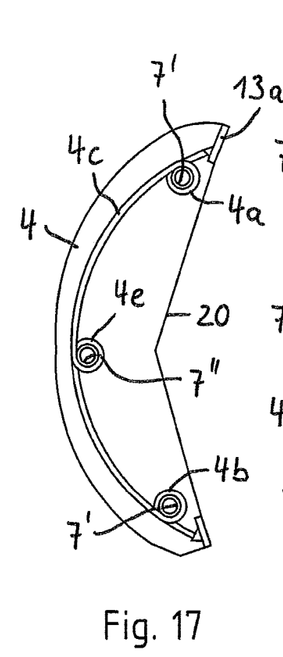
FIG. 17 illustrates a cross sectional view of the stripping body of FIG. 16.

In the embodiment illustrated in FIGS. 16 and 17, an additional tube or hose 7" is disposed between the sleeves or tubes 7', which are used for form-locking receiving of the carrying element 3a and the liftoff element 3b, and integrated in the stripping body 4. The tube or hose 7" is used for receiving an additional support or connection element, which can also be made from a steel chain or steel cable or a metal rod. Accordingly, the spring element 4c includes a third loop shaped section 4e, which is permeated by the tube or hose 7".

In the embodiment illustrated in FIGS. 18-21, the bendable flexible stripping body 4 is pulled against the conveyor belt 2 rotated about a three-dimensional curve, wherein the stripping body 4 is made from a plurality of relatively narrow, serially arranged partial bodies (component elements) 4d.

The force induction is performed through a force limiting spring, preferably a vibration absorbing gas pressure spring 6a, which engages at the lower end of the stripping body. This force induction portion is provided with a rated breakpoint, which provides a release of the stripping body 4 from the respective attachment point 5a, when a particular maximum force is exceeded.

The component elements 4d of the stripping body 4 have a substantially double pitch roof shaped cross sectional profile. They are cast or injection molded from plastic material or rubber. Each component element 4d includes plates 13a, 13b made from wear resistant ceramics or hard metal at the contact portions oriented towards the conveyor belt 2, wherein the plates are configured to slide on the belt 2. The wear elements 13a positioned at the top of the stripping body 4 form stripping edges for cleaning the belt 2 from still adhering feed material. The length of the stripping body 4 is sized so that it slightly exceeds the lateral edges of the conveyor belt to be cleaned.

Sleeves or hose sections 7' are embedded into the material of the respective component elements 4d of the stripping body 4, wherein steel chains configured as support or liftoff elements 3a, 3b are run through the sleeves or hose sections 7' disposed proximal to the longitudinal edges of the stripping body 4, wherein the steel chains are attached at the hard points 5a, 5b of a steel frame supporting the discharge drum 1 through attachment devices, in particular tension elements coupled with tension springs or gas pressure springs.

Below the ridge of the double pitch roof shaped component element 4d, another sleeve 7" or another hose section is embedded in the material of the component element. A metal rod or a steel cable is inserted into the axially aligned sleeves or hose sections 7". All component elements (partial bodies) 4d are connected with one another through this metal rod or steel cable, and they are put under slight tension from the first partial component to the last partial body. It is an essential object of this support or tension element to position the particular segments 4d of the stripping body 4 without gaps between one another, and to support the respective adjacent element 4d. When a particular element 4d is e.g. lifted through a damaged belt or a belt connection seam, this movement is partially transferred to the adjacent element 4d, and the adjacent element 4d is partially raised with it. The belt damage or the belt connection seam thus passes below the stripping body 4 without causing any problems.

Figure 18:
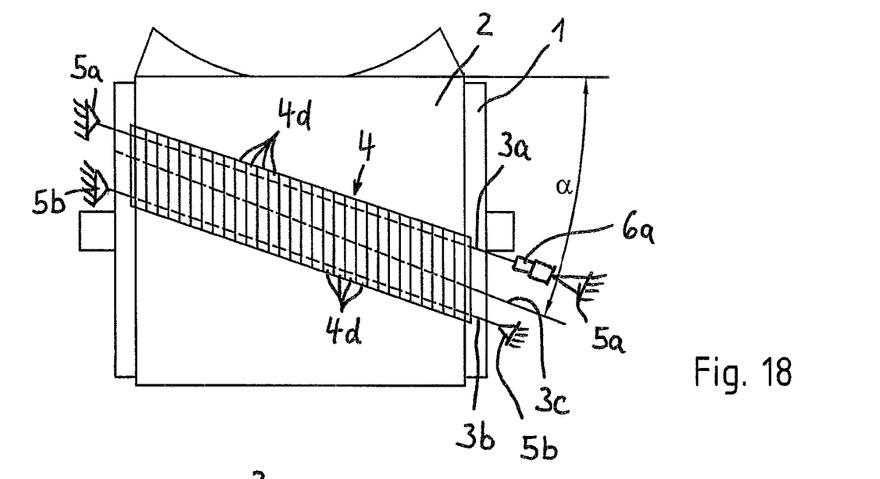
FIGS. 18-21 illustrate a discharge drum of a belt conveyor with another stripping device according to the invention, whose stripping body formed from a plurality of serial partial bodies is pulled against the conveyor belt in a helical shape over a portion of the circumference of the discharge drum in longitudinal lateral view, frontal view, top view and in a perspective view.
Figure 19:
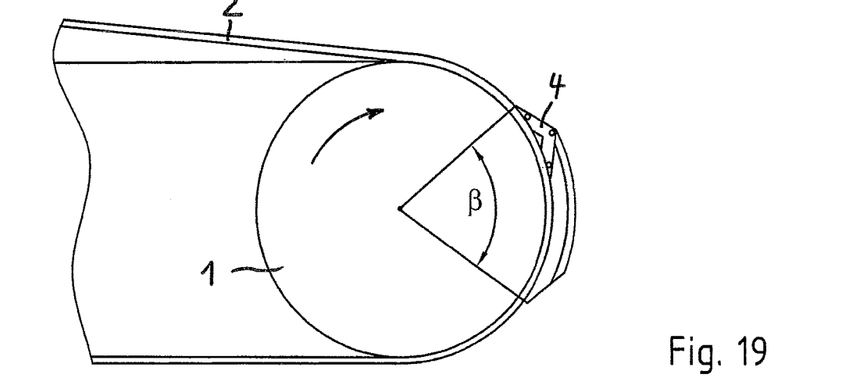
Figure 20:
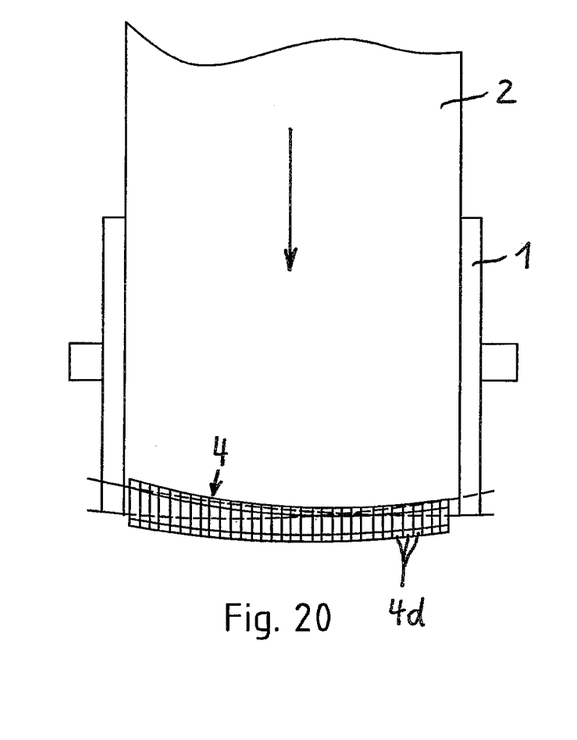
Figures 21, 22:
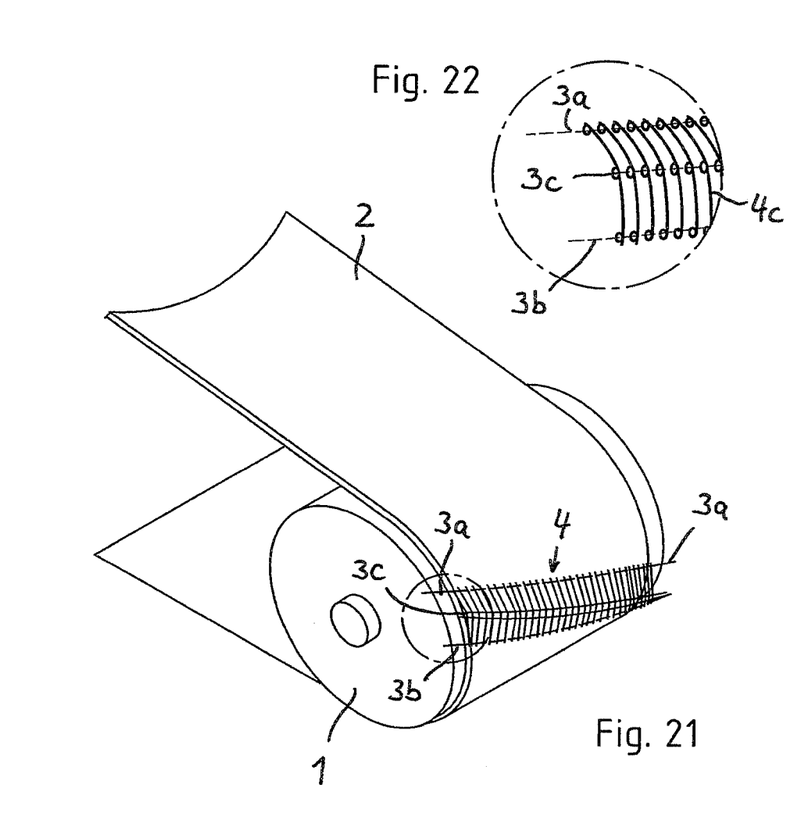
FIG. 22 illustrates an enlarged detail of FIG. 21.

The stripping body 4 is pulled by the carrying element 3a and the essentially parallel extending lift-off element 3b against the discharge drum 1 enveloped by the conveyor belt 2, so that the rod-shaped connection element 3c extends at a slant angle to the belt running direction and encloses an angle α in a range of approximately 15° to 25°, preferably approximately 20°, with the substantially horizontal belt top side extending parallel to the rotation axis of the discharge drum 1 (cf. FIG. 18). The dirt particles to be stripped off from the conveyor belt 2 thus impact the stripping edge 13.1 of the stripping elements 13a at a slant angle. Furthermore, the stripping body 4 is disposed at the conveyor belt 2, so that it extends over an enveloping angle β in a range of about 70° to 80°, e.g. approximately 76° (cf. FIG. 19).

The contact force of the stripping body 4 caused by axial tightening of the carrying element 3a (and the lift-off element) is almost without force in the outer portions (edge portions) of the belt 2, since the carrying element 3a extends tangential to the drum 1 in the area of the two ends of the stripping body 4. The contact force is the greatest in the main operating area of the stripping body 4, thus in the center of the belt, but the contact force is defined through the tension force adjustable at the carrying element 3a. The stripping device extending over a three-dimensional curve at the discharge drum 1 can be advantageously used for belt conveyors, whose conveyor belt 2 is formed from conveyor belt pieces that are clamped or connected with hook connections. When the connection seam of the belt 2 contacts the upper end of the component element 4d of the stripping body 4, the connection seam passes almost without any force below the stripping body. The support function provided by the adjacent component element 4d assures that the connection seam of the belt 2 slides along the stripping body 4 without causing any damage.

Figure 23:
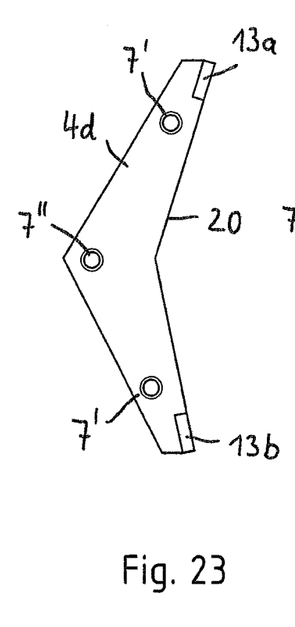
FIG. 23 illustrates a cross sectional view of a partial body of another stripping body.
Figure 24:
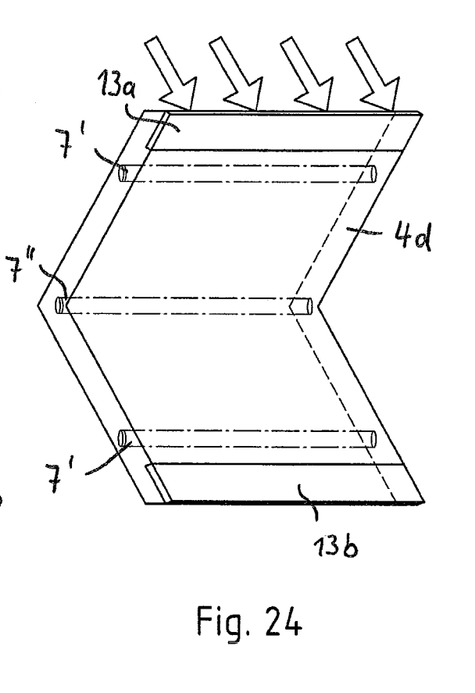
FIG. 24 illustrates the partial body of FIG. 23 in a perspective view.
Figures 25, 26:
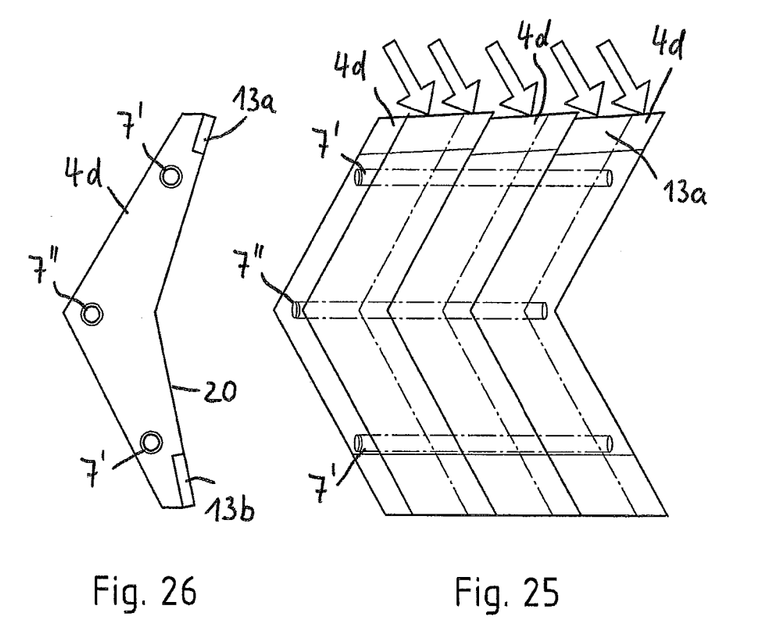
FIG. 25 illustrates three partial bodies of another stripping body in a perspective view.
FIG. 26 illustrates a cross sectional view of a partial body of FIG. 25.
Figure 27:
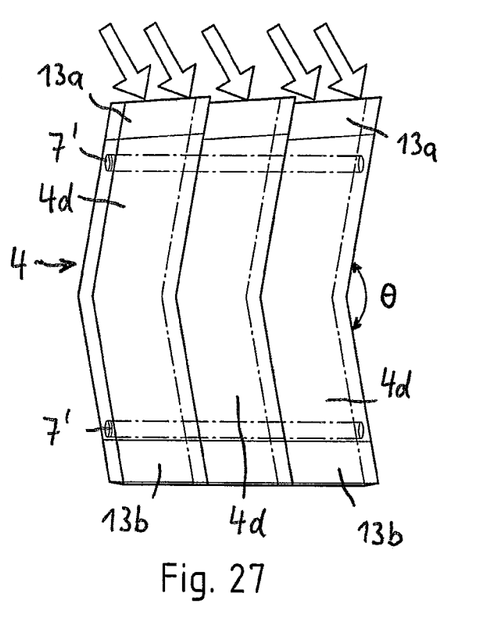
FIG. 27 illustrates three partial bodies of another stripping body in a perspective view.
Figure 28:
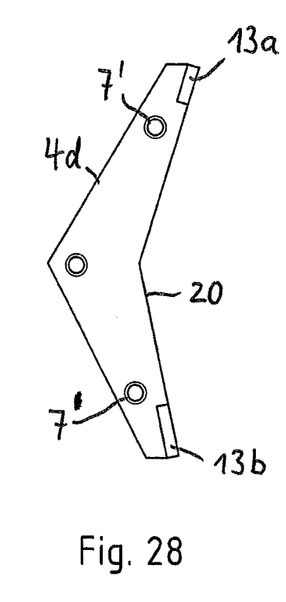
FIG. 28 illustrates a sectional view of a partial body of FIG. 27.

FIGS. 23 and 24 illustrate a partial body (component element) 4d of a stripping body 4 which is assembled through serially arranging a plurality of such partial bodies 4d. The partial body 4d has an essentially double pitch roof shaped cross sectional profile and is provided with wear elements 13a, 13b contacting the conveyor belt and made from wear resistant material at its upper and lower longitudinal edge. Tubes or hose sections 7', 7" are integrated into the less wear resistant material of the partial body 4d, wherein the material is bendable compared to the wear elements, wherein the tubes or hose sections extend essentially in parallel to the longitudinal edges of the partial component 4d, and are used for receiving (pass-through) the carrying element, the lift-off element and a support element.

FIGS. 25-28 illustrate additional embodiments of stripping bodies 4 assembled from narrow particular elements 4d for a stripping device according to the invention. The particular elements 4d are in turn configured with a double pitch roof shape or V-shaped and provided with wear elements 13a, 13b. The spreading angle θ of the particular element legs is a function of the radius 19 of the discharge drum 1. The spreading angle can be close to 180°, e.g. 170°. The upper wear elements 13a oriented towards the belt running direction are used as stripping elements and define straight stripping edges 13.1. The stripping edges 13.1 of adjacent or sequential stripping elements are disposed relative to one another offset in steps. Thus, the component elements 4d of the stripping body 4 are aligned like scales.

Figure 30:
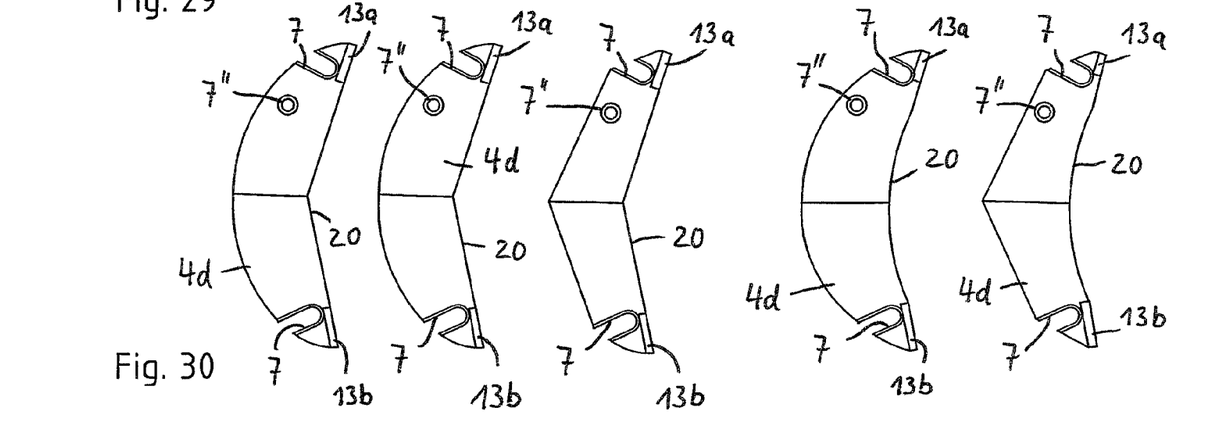
FIG. 30 illustrates five differently configured partial stripping bodies of a device according to the invention in a cross sectional view.

In the embodiments of various cross sectional profiles of the stripping body 4 illustrated in FIG. 30 the receivers 7 for the carrying element and the lift-off element are configured as open channels. This embodiment allows a quick exchange of the stripping body 4 or of particular elements 4d of the stripping body 4. This variant is advantageous in particular when the wear of particular elements 4d of the stripping body 4 is high due to the lack of wear elements and/or the exchange interval is short.

The invention claimed is:

1. A device for stripping material from a conveyor belt of a belt conveyor comprising a stripping body that is configured integral in one piece or configured in a plurality of pieces, wherein the stripping body is provided with a carrying element formed from a steel cable, a metal chain, or both through which the stripping body is pulled or pullable against the conveyor belt, wherein the stripping body is further provided with a lift-off element which is disposed in the stripping body and offset from the carrying element and supports the stripping body when the stripping body is displaced in a belt running direction, and
   wherein the stripping of material from the conveyor belt is in a region of a curve of a discharge drum below a discharge location of the belt conveyor.

2. The device according to claim 1, wherein the lift-off element is made from a steel cable, a metal chain, or both.

3. The device according to claim 1, wherein the carrying element is disposed in a receiver configured in the stripping body.

4. The device according to claim 3 wherein the receiver is configured as an open channel.

5. The device according to claim 1, wherein the lift-off element is disposed in a receiver configured in the stripping body, and the receiver is configured offset from the carrying element or offset from a the receiver associated with the carrying element.

6. The device according to claim 5, wherein the receiver is configured as an open channel.

7. The device according to claim 1, wherein the carrying element, the lift-off element, or both are attached at an attachment element including a rated break point.

8. The device according to claim 1, wherein the stripping body is made from elastically bendable material.

9. The device according to claim 1, wherein the stripping body includes at least two edge portions oriented towards the conveyor belt, wherein at least an upper edge portion or at least the first edge portion in the running direction of the conveyor belt is formed by at least one stripping element, which has increased wear resistance compared to a material of the stripping body.

10. The device according to claim 9, wherein the at least one stripping element is made from hard metal, ceramics, or both.

11. The device according to claim 9, wherein the at least one stripping element is provided with at least one spring element.

12. The device according to claim 11, wherein the spring element includes at least one loop shaped section.

13. The device according to claim 12, wherein the loop shaped section of the spring element is penetrated by the carrying element, the lift-off element, a rod shaped connection element, or a cable shaped connection element.

14. The device according to claim 1, wherein the stripping body includes at its side facing the conveyor belt a recess, wherein the recess extends in a longitudinal direction of the stripping body.

15. The device according to claim 1, wherein the stripping body includes a plurality of stripping elements which define stripping edges and which have improved wear resistance compared to a material of the stripping body, wherein the stripping elements are configured, arranged, or both configured and arranged, so that the stripping edges of adjacent stripping elements partially overlap.

16. The device according to claim 15, wherein the stripping edges of adjacent or sequential stripping elements are disposed offset from one another in steps.

17. The device according to claim 16, wherein the stripping edges of sequential stripping elements are disposed alternatively recessed and protruding relative to one another.

18. The device according to claim 1, wherein the stripping body is formed from overlapping partial bodies which are arranged in series on a common rod shaped connection element.

19. The device according to claim 1, wherein the stripping body is pulled against the conveyor belt and the stripping body is twisted in a three dimensional curve.

20. The device according to claim 1, wherein the carrying element is provided with a tension spring, a gas pressure spring, or both in a pull direction.

* * * * *

UNITED STATES PATENT AND TRADEMARK OFFICE
CERTIFICATE OF CORRECTION

PATENT NO.       : 8,528,724 B2  
APPLICATION NO.  : 12/935993  
DATED            : September 10, 2013  
INVENTOR(S)      : Wilfried Dünnwald Page 1 of 1

It is certified that error appears in the above-identified patent and that said Letters Patent is hereby corrected as shown below:

Title Page:
Item (57) Abstract, Line 15, after "elements" delete "overlap".

In the Claims:
Column 10, Line 33, Claim 5, after "from" delete "a".

Signed and Sealed this
Fourteenth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,528,724 B2
APPLICATION NO. : 12/935993
DATED             : September 10, 2013
INVENTOR(S)       : Wilfried Dunnwald It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 92 days.

Signed and Sealed this

Fifteenth Day of September, 2015

Michelle K. Lee
*Director of the United States Patent and Trademark Office*